(12) United States Patent
Whittenberger et al.

(10) Patent No.: US 9,901,898 B2
(45) Date of Patent: Feb. 27, 2018

(54) EXPANDING CENTERS FOR STACKABLE STRUCTURAL REACTORS

(71) Applicant: Catacel Corp., Garrettsville, OH (US)

(72) Inventors: William A. Whittenberger, Leavittsburg, OH (US); Joseph W. Whittenberger, Ravenna, OH (US); Brian L. Davis, Ravenna, OH (US); James A. Rundo, Chesterland, OH (US)

(73) Assignee: Johnson Matthey Public Limited Company, London (GB)

( * ) Notice: Subject to any disclaimer, the term of this patent is extended or adjusted under 35 U.S.C. 154(b) by 1225 days.

(21) Appl. No.: 13/853,405

(22) Filed: Mar. 29, 2013

(65) Prior Publication Data
US 2013/0259757 A1 Oct. 3, 2013

Related U.S. Application Data

(60) Provisional application No. 61/619,497, filed on Apr. 3, 2012.

(51) Int. Cl.
*B01J 19/24* (2006.01)
*B01J 19/32* (2006.01)
*B01J 19/30* (2006.01)

(52) U.S. Cl.
CPC ............ *B01J 19/32* (2013.01); *B01J 19/244* (2013.01); *B01J 19/2485* (2013.01); *B01J 19/30* (2013.01);
(Continued)

(58) Field of Classification Search
CPC ........ B01J 2219/2402; B01J 2219/2443; B01J 2219/2496; B01J 2219/32275
See application file for complete search history.

(56) References Cited

U.S. PATENT DOCUMENTS 3,261,598 A * 7/1966 Jones ................... F16F 1/32
267/161
3,375,000 A * 3/1968 Seamands ............. F16F 1/32
267/162
(Continued)

FOREIGN PATENT DOCUMENTS

| DE | 1179424 B | * 10/1964 | ............... F16F 1/32 |
|---|---|---|---|
| EP | 1857174 | 11/2007 | |
| RU | 2423657 | 7/2011 | |

OTHER PUBLICATIONS

The International Search Report and Written Opinion issued in International Patent Application No. PCT/US2013/034590, dated Aug. 22, 2013.

*Primary Examiner* — Jennifer A Leung
(74) *Attorney, Agent, or Firm* — Kevin M. Carroll; Pearne & Gordon LLP

(57) ABSTRACT

Described herein are expandable center arrangements for use in a tubular reactor, such as a reformer, for enhancing heat transfer and reactor efficiency. The expandable center arrangement can include a cone being expandable in the radial direction and an expansion weight for promoting expansion of the cone. The cone and expansion weight can be slidably arranged on a center support. Expansion of the cones in the radial direction forces reactor components radially outward to an outer tube that houses the reactor components and expandable center arrangement. Expansion of reactor components towards the outer tube promotes heat for carrying out catalytic reactions.

14 Claims, 6 Drawing Sheets

(52) U.S. Cl.
CPC ...... *B01J 19/325* (2013.01); *B01J 2219/2402* (2013.01); *B01J 2219/2416* (2013.01); *B01J 2219/2422* (2013.01); *B01J 2219/2443* (2013.01); *B01J 2219/2448* (2013.01); *B01J 2219/2496* (2013.01); *B01J 2219/30226* (2013.01); *B01J 2219/30408* (2013.01); *B01J 2219/32275* (2013.01)

(56) References Cited

U.S. PATENT DOCUMENTS

| | | | | |
|---|---|---|---|---|
| 3,990,858 | A | * | 11/1976 | O'Sullivan ............... F15D 1/02 138/40 |
| 4,204,558 | A | * | 5/1980 | Johnson .................... F16K 1/22 137/315.24 |
| 4,283,615 | A | * | 8/1981 | Vrillon ............... B23K 11/3081 165/76 |
| 4,711,434 | A | * | 12/1987 | Haag ....................... F16F 1/328 267/161 |
| 7,501,102 | B2 | | 3/2009 | Whittenberger et al. |
| 7,682,580 | B2 | | 3/2010 | Whittenberger et al. |
| 7,854,425 | B2 | * | 12/2010 | Evans ....................... F16F 1/32 267/162 |
| 7,906,079 | B2 | | 3/2011 | Whittenberger et al. |
| 2007/0025893 | A1 | * | 2/2007 | Whittenberger ....... B01J 12/007 422/211 |
| 2008/0145284 | A1 | * | 6/2008 | Whittenberger ....... B01J 10/007 422/600 |
| 2010/0040190 | A1 | | 2/2010 | Tentarelli |
| 2012/0195801 | A1 | | 8/2012 | Whittenberger et al. |

\* cited by examiner

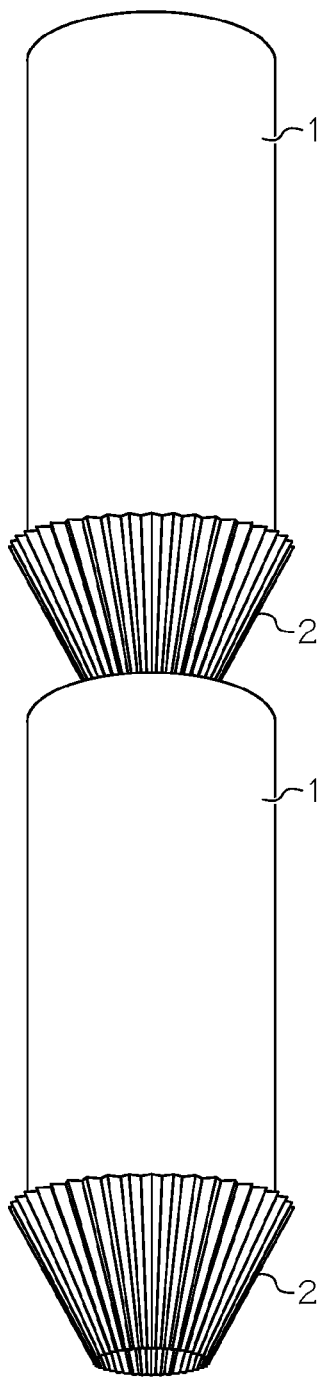
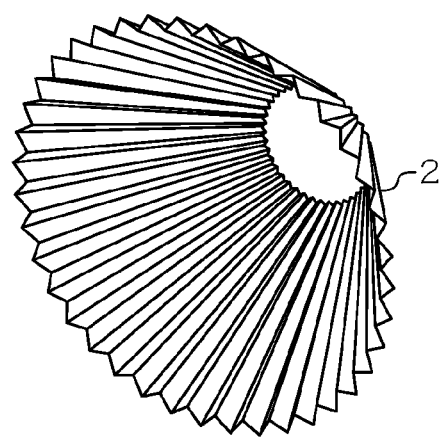
FIG. 1B
FIG. 1A

EXPANDING CENTERS FOR STACKABLE STRUCTURAL REACTORS

This application claims the benefit of U.S. Provisional Application No. 61/619,497, filed Apr. 3, 2012, which is incorporated herein by reference in its entirety.

FIELD OF THE INVENTION

The present invention relates to improved stackable structural reactors having increased efficiency and productivity, and in particular, improved stackable structural reactors having expandable center arrangements for increased heat transfer and reactor efficiency.

BACKGROUND

Reactor components for carrying out catalytic reactions, such as those used to produce syngas or hydrogen, can generally contact reactor tubes exposed to a heat source, for example a furnace, to support reactions. In contrast, other types of reactions, such as exothermic reactions, can require a cooling source, such as a cooling jacket. The reactor tubes can be loaded with various arrangements of components, such as foil-supported or structured catalysts in the form of fans, fins, coils, foams, or monoliths. In some instances, the reactor components can be expandable, such as those formed from foil, for example, a fan.

To improve heat transfer and fluid flow through a reactor, the fit of foil-supported catalysts can be enhanced. In a reactor tube, expandable catalyst-coated reactor components can be positioned to increase heat transfer, such as being in contact with or in a controlled proximity to the reactor wall exposed to a heating or cooling source. Thus, it is desirable to fit reactors with accessories to promote increased heat transfer and reactor efficiency. Various embodiments of expanding center components and arrangements for improving performance of reactors are discussed herein.

BRIEF SUMMARY

Described herein are expandable center arrangements for use in a reactor, such as a reformer, to enhance heat transfer and reactor efficiency. The expandable center arrangement can include a center support that traverses the length of the reactor or portion thereof, one or more cones positioned on and along the length of the center support and one or more expansion weights also positioned on and along the length of the center support. At least one of the one or more expansion weights can be arranged on the center support above a cone to promote and provide force for expansion in the radial direction. The one or more cones and one or more expansion weights can be capable of sliding on the center support during expansion of the cones.

A reactor, such as a reformer, can include an expandable center arrangement. The reactor can include an outer tube for housing reactor components and an inner tube for housing the expandable center arrangement. The reactor components can be an expandable catalyst support that occupies an annular space or portion thereof between the outer tube and the inner tube that are concentrically arranged. The inner tube can be expandable in the radial direction. The expandable center arrangement positioned within the inner tube can include one or more cones, wherein the one or more cones are expandable in the radial direction. The outermost diameter surface of the cones can in contact with the inner tube. The expandable center arrangement can also include one or more expansion weights. Preferably, the expansion weights are not in contact with the inner tube. At least one of the one or more expansion weights can be in contact with the one or more cones, for example in an alternating stacked pattern. The one or more expansion weights promote and provide force for expansion of the one or more cones in the radial direction. Additional external forces pushing on the expansion weights can be used to further expand the cones, for instance, during installation of reactor components. The one or more cones and one or more expansion weights can be capable of sliding on the center support during expansion of the cones.

BRIEF DESCRIPTION OF THE DRAWINGS

The following figures illustrate various aspects of one or more embodiments of the present invention, but are not intended to limit the present invention to the embodiments shown.

FIG. 1A shows a perspective view of an expanding center arrangement of stacked cones and expansion weights.

FIG. 1B shows a perspective view of a radially-expandable, corrugated cone suitable for use in an expanding center arrangement.

DETAILED DESCRIPTION

Figure 2:
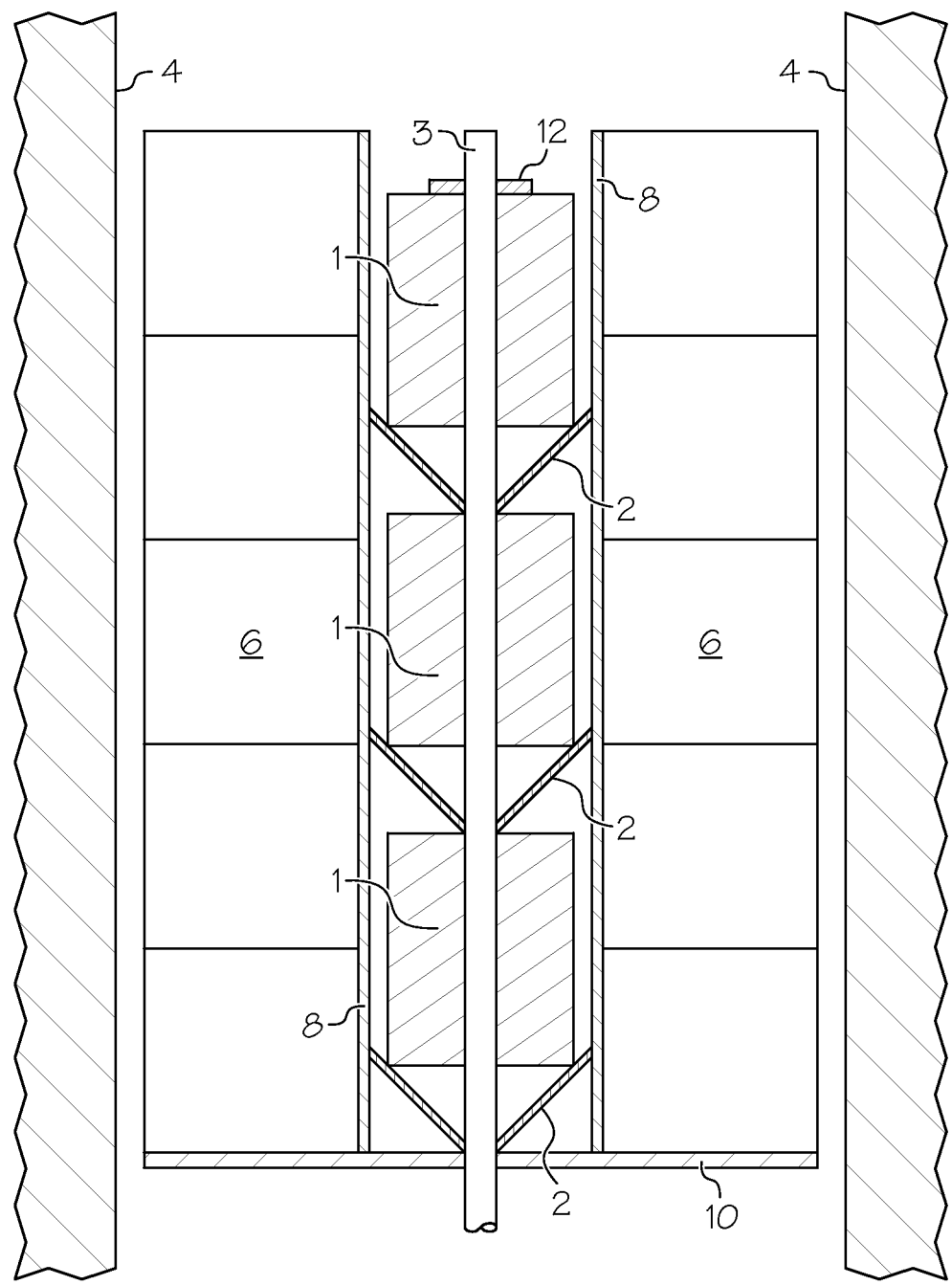
FIG. 2 shows a cross-section view of a reactor tube having an expanding center arrangement including downward facing cones and expansion weights wherein the expanding center arrangement is in the collapsed position.

As used herein, when a range such as 5-25 is given, this means at least or more than 5 and, separately and independently less than or not more than 25. Materials of construction for all reactor components or parts thereof, such as cones, expansion weights, catalyst supports, center supports and inner and outer tubes, as discussed herein, can include any suitable material as known in the art, for example, metal, non-ferrous metal, metal foil, steel, stainless steel, alloys, foils, non-metals such as plastics or glass, ceramic, or combinations thereof.

The reactors as described herein, sometimes referred to as a stackable structural reactors ("SSR"), can include multiple catalyst support components arranged around or stacked on a center support, such as a central rod or mandrel, pipe, post or the like, in order to form a monolith of general annular cross section as viewed in the direction of flow of fluid through the reactor. The monolith or stacked catalyst supports can occupy all or a portion of the annular space between two concentrically arranged tubes, such as an outer tube and an inner tube. As described herein, various modifications and embodiments of the reactors and associated reactor components can be used in connection with expandable center arrangements to promote heat transfer and reactor efficiency.

FIG. 1A shows an expandable center arrangement for use in a reactor. The expandable center arrangement can include a series of stacked cones 2 and expansion weights 1 arranged in alternating order on a center support 3. The cones 2 can be made of any suitable material, such as metal, steel, stainless steel, alloys, foil, etc. As shown in FIG. 1B, the cones 2 can be made of corrugated metal foil such that each cone is expandable in the radial direction. Alternatively, stamped/formed from a flat disc or piece of metal, with corrugations or folds that enable the radial expansion, much like a paper coffee filter. The expandable cones can be at rest in the collapsed position or in the expanded position, for example, during operation of a reactor. As described herein, the collapsed position of the cone 2 refers to the cone at rest and at standard temperature without an expansion weight asserting force on the cone. For example, the collapsed position also indicates that the cone 2 is not exposed to any forces that would cause the cone to expand radially outward, such as a downward weight or imposed force resting on the cone. The expanded position of the cone 2 refers to the dimensions thereof as force is applied to the cone, such as downward force generated by placing a weight on the cone, such as an expansion weight. As described below, expansion weights can be arranged in the center section of the reactor to impose downward forces for radially expanding the cones 2.

The cones 2 have two ends, a top end having a small opening or aperture and a bottom end having a larger opening or aperture. As arranged on the center support 3, the cones 2 can slide on the support 3 along its length to accommodate movement in the reactor center. The center support 3 remains in a fixed or stationary position during operation of the reactor while the cones 2 can travel up and down or along the length of the center support as the cones expand and contract. The shape and diameter or dimensions of the center support 3 can be selected to align with the openings in the cones 2 and expansion weights 1. For example, a cylindrical rod 3 can be used as shown to support the cones 2 and expansion weights 1 having centered circular openings. The cylindrical rod 3 can have a diameter about the same or slightly less than the diameter of the openings in the cones and expansion weights.

The small top end opening diameter of the cone 2 can be at least 0.2, 0.25, 0.3, 0.4, 0.5, 0.75, 1, 1.25, 1.5, 0.75 or 2 inch and preferably in the range of 0.25 to 0.75 inch. The large bottom end opening diameter of the cone 2, in the collapsed position, can be at least 0.5, 1, 1.5, 2, 2.5 or 3 inch. The large bottom end opening diameter of the cone 2, in the expanded position, can be at least 1, 1.5, 2, 2.5, 3, 3.5 or 4 inch. Each cone 2, in the collapsed position, can have a height of at least 0.5, 1, 1.5, 2, 2.5 or 3 inch. Each cone 2, in the expanded position, can have a height of at least 0.1, 0.2, 0.3, 0.4, 0.5, 0.6, 0.7, 0.8, 0.9, 1, 1.25, 1.5 or 2 inch. The cones can be arranged in the upward facing position or, as shown, in the downward facing position. A series of cones can be arranged, either all in direct contact or alternating with expansion weights, either in the upward, downward or a combination thereof, on a center support. Depending on the height of the reactor, the number of cones in the series can be selected to accommodate supporting the reactor components, for example, the series of cones can include 2, 3, 4, 5, 6, 7, 8, 9, 10 or more cones.

As shown, the cones can be arranged on a center support with the aperture in the top end of the cone in contact with the center support. The bottom end is located radially outward away from the center support. In use, the bottom end of the cones can be in contact with an inner tube and/or reactor components. Expandable in the radial direction, the cones can push reactor components and/or an inner tube surrounding the cones radially outward. The cones can provide tension to surrounding components during reactor operation to promote outward expansion of the components towards an outer reactor tube to increase reactor efficiency. To promote expansion of the cones 2, expansion weights 1 can be used.

FIG. 1A shows a first and second expansion weight 1 positioned in series on the center support 3 above each cone 2. The expansion weights 1 can be slidably arranged on the center support 3 such that the weights 1 can be positioned to contact or provide a pushing force on the cones 2. During an installation, the weights can slide on the center support and transfer an external force to the cones and make them expand. Similar to the cones 2 above, the center support 3 remains in a fixed or stationary position during operation of the reactor while the expansion weights 1 can travel up and down or along the length of the center support as the cones expand and contract. To provide a constant pushing force on the cones 2, the weight of the expansion weights 1 can be modified to provide any desired weight for expanding the cones 2, for example, 0.1 to 5 lb. and preferably 0.15 to 0.5 lb. weights can be used. In another embodiment, an external force can be utilized to provide additional pushing force on the cones 2 to promote expansion for installation purposes. For example, a gravity weight or pneumatic cylinder can be used to push on the expansion weights for expanding the cones radially outward. An external pushing force on the expansion weights can be in the range of 50 to 500 lbs. and preferably 200 to 300 lbs.

The expansion weights 1 can be any suitable shape, such as spheres or cylindrical tubes or a stack of washers. In one embodiment, the expansion weight can be a cylindrical tube having rounded edges at each end for contacting cones. The expansion weights 1 can have an opening, preferably at its center, that traverses the entire length of the weight for accommodating the central support 3 or the like. In case a center support is not used, the expansion weight can be solid without any apertures. The opening of the expansion weight 1 can be at least 0.2, 0.25, 0.5, 0.75, 1, 1.25, 1.5, 1.75 or 2 inch and preferably in the range of 0.25 to 0.75 inches. In one embodiment, the opening in the expansion weight 1 can be the same as the small top end opening of the cones 2. The expansion weights 1 can have a height of at least 0.5, 1, 2, 3, 4, 5, 6, 7, 8, 9 or 10 inches and an outer diameter of at least 0.5, 0.6, 1, 1.5, 2, 2.5 or 3 inches. In one embodiment, the outer diameter of the expansion weight is about the same or slightly less than the bottom end diameter of a collapsed cone. For example, the outer diameter of the expansion weight 1 is at least 50, 60, 70, 75, 80, 85, 90 or 95% of the diameter of the bottom large end opening of a cone. This permits an expansion weight 1 to have more leverage on a cone as it pushes on the inner face of a cone facing in the downward position. The expansion weights 1 can have an outer diameter that is less than the inner tube and large bottom end diameter of the cones 2. For instance, as shown in FIG. 1A, the expansion weights 1 can rest on inner face of the cones 2 arranged in the downward facing position. As aligned on the center support 3, the expansion weights 1 can float freely such that each weight is capable of sliding on the center support 3 to contact a cone 2 positioned below the weight. The expansion weights 1 can exert a downward force on the cones 2 such that the cones expand radially outward to push against the inner tube and reactor components. The expansion weights 1 can be made of any suitable material, for example, metal or ceramic.

Turning to FIG. 2, a reactor or outer tube 4 having an inner wall surface and an outer wall surface, such as a reformer tube, houses reactor components 6, such as vertically stacked fans or monoliths, arranged around a center support 3. The diameter of the outer tube 4 is preferably constant along its entire length. In the case of reformer tubes, portions of the tube 4 can have a larger diameter and create bulges or expanded portions in the outer tube. As described above, reactor components 6 are constructed to have a central opening for receiving the center support 3 and center section components, such as an inner tube 8, an expanding center arrangement of expansion weights 1, cones 2, etc., such that the components can be stacked or arranged on the center support 3 inside in the outer tube 4. The center support 3 can have a length to accommodate the length of the outer tube 4. As shown, the center support 3 can have a bracket, bushing, base plate 10 and the like for providing a stop fitting so the reactor components, such as a fan or monolith 6, do not slide off of the center support 3. The base plate 10 can be located at or near the bottom end of the center support 3 and can have a shape and diameter or dimensions to permit ease of install in the outer tube 4. For instance, the stop plate 10 can have a circular shape with a diameter about the same or less than the inner diameter of the outer tube.

The center support 3 can be preloaded with any number of reactor components or washers, not shown, before being inserted into the outer tube 4. The components 6 can be stacked vertically, one on top of another as shown, to form layers of reactor components, either vertically or in alternative ways such as horizontal to accommodate orientation of a reactor or certain technology requirements. Washers (not shown) can be inserted between one or more reactor components (e.g., fans) as desired, for example, each fan can be separated by a washer wherein the washer creates an open space between the components 6. Stacked reactor components 6 can be arranged vertically as desired, for example, in the range of 0.5 to 4 feet, to create a subassembly. Multiple subassemblies can be stacked together in a reactor, for example from 1 to 60 subassemblies can be stacked. The stacked subassemblies can have a height in the range of 2 to 60 feet.

As noted above, the reactor components 6 can be fans or monoliths, either used with or without washers. In one embodiment, the reactor components 6 can be catalyst supports, such as fans, coils or monoliths having one or more catalyst coatings. Washers used in connection with the components 6 can also have a catalyst coating to effectively distribute catalyst contact with the fluid flowing through the reactor. Catalytic material is known in the art and can include nickel, palladium, platinum, zirconium, rhodium, ruthenium, iridium, cobalt and oxides of aluminum, cerium, and zirconium.

The catalyst supports 6 can be expandable in the radial direction such that the supports can be pushed outward radially to the outer tube 4. As arranged in the outer tube 4, the reactor components 6 can occupy a portion or substantially the entire annular space between the outer tube 4 and the inner tube 8. The components 6, when expandable and in the collapsed state, have a diameter less than the outer tube 4. In the expanded position, the components 6 can be in direct contact with the outer tube 4 or create a small gap between the outer tube 4 and the outer diameter face of the components 6. The gap between the outer edge diameter face of the reactor components and the inner wall surface of the reactor tube can be at least 0.5, 1, 2, 3, 5, 10 or 15 mm, and preferably in the range of 0.5 to 6 mm, and more preferably 1 to 3 mm. The gap promotes heat transfer and forces fluid flow traveling toward the inner wall surface of the reactor wall to be directed back towards the inner portion of the reactor. Spacers, such as a washer, wire, ring, loop or the like, can be used to ensure desirable gap spacing between the outer diameter edge or face of the monoliths or fans and the inner wall surface of the reactor tube. Fluid, such as gas or liquid, to be reacted generally flows vertically, either up flow or down flow as desired, through the reactor tube 4 and through each component 6 arranged on the center support 3, preferably outside of the inner tube 8. Reactor components 6 direct fluid flow in other non-vertical directions to increase heat transfer, for example fans can direct or guide fluid flow radially (perpendicular to the overall vertical direction) towards the reactor tube wall 4. One or more monoliths or fans 6 can be in contact or close proximity of the inner wall surface of the reactor tube 4, which effectively transfers heat from the exterior of the reactor to the reactor components and fluid contained therein for promoting catalytic reactions.

At the center section of the reactor tube an expandable center arrangement can be used. Housing the expandable center arrangement is an inner tube. The inner tube 8 can be corrugated or composed of rolled metal sheet or flat sheet rolled in a cylinder such that there is a lap section at the point the two ends of the sheet meet. That is, the ends of the rolled sheet loosely overlap and as force is exerted inside the cylinder or tube the lap portion slides and the inner tube 8 expands radially outward. For example, the inner tube 8 can be made of a foil sheet rolled into a cylinder having the dimensions described above or the inner tube 8 can be multiple segments that overlap one another, such as 2 to 6 individual segments. In a similar manner, the cones 2, instead of being corrugated, can be made from sheets rolled into cones wherein the two ends of the rolled sheet create a lap portion that allows for radial expansion as force is exerted on the cone 2.

As shown in FIG. 2, within the inner tube 8 cones 2 expandable in the radial direction can be positioned on the center support 3 to provide tension to the reactor components 6 and inner tube 8 and push such components 6 towards the outer tube 1 during reactor operation. The cones 2, as shown, are arranged in a downward facing position with the small top end of the cone located below the large bottom end of the cone. The small top end of the cones 2 can be fitted with or without a bushing for accommodating the center support 3. The large bottom end of the cone 2 contacts the inner tube 8. At its outer diameter, the inner tube 8 contacts the reactor components 6, such as the expandable catalyst-coated fans as shown. Because the cones 2 push radially outward against the inner tube 8, the inner tube 8 can be in constant contact with the reactor components 6 to prevent or eliminate a gap between the inner diameter of the reactor components 6 and the outer diameter of the inner tube 8. Reducing or eliminating any gap spacing between the inner diameter of the reactor components and the outer diameter of the inner tube increases the amount of fluid that is directed to the outer portion of the reactor near the reactor tube 1 wall, which can increase heat exchange and reaction efficiency.

A series of cones 2 and expansion weights 1 can be used to promote expansion of the reactor components 6 against the outer tube 4. As shown, alternating expansion weights 1 and cones 2 can be slidably stacked on the center support 3 such that each expansion weight 1 is above and in contact with a cone 2 wherein gravity allows the expansion weight 1 to push on the cone to expand it. In this arrangement, the expansion weights 1 contact the inner face of the cones 2 at or near the inside of the large bottom end of the cones, wherein the top end of the downward facing cones can contact an expansion weight directly below. As the first expansion weight, top most, pushes on the first cone, top most, the first cone expands radially outward on the inner tube 8, which is also expandable in the radial direction. As the first cone expands, its overall height is reduced as its bottom end diameter increases. As the cones expand, the cones and expansion weights slide downward on the center support 3.

The expandable center arrangement can further include a locking means 12 for securing the expansion weights 1 and cones 2 in place. The locking means 12 can be a lock nut, lock washer, stop fitting or the like. The locking means 12 can be positioned above the top most expansion weight 1 as shown in FIG. 2. Preferably, the locking means 12 can be secured to the center support 3, for example by compression force or welding. Once secured to the center support 3, the locking means 12 prevents the top most expansion weight 1 from traveling upward or in the opposite direction away from the cones 2. For installation purposes, the locking means can slide onto the center support such that it is positioned above the top most expansion weight. As the expansion weights 1 push and expand the cones, and perhaps additional force is applied to the expansion weights to promote cone expansion, the locking means 12 can be secured in place at or near the top surface of the expansion weight 1. Preferably, the locking means 12 is in direct contact with the top most expansion weight when the cones are in the expanded position. The reactor components 6 remain in an expanded position since the expansion weight 1 is prevented from sliding upward on the center support 3 to release the cones 2 back into a collapsed position.

As arranged in an alternating series of expansion weights and cones, the bottom most cone 2 rests on the base plate 10 located on the center support 3. The base plate 10 is fixed and does not slide on the center support 3. Thus, the expandable center arrangement of the reactor has a fixed end at the stop plate 10 and a moveable center portion since the expansion weights and cones can slide on the support 3. Securing a locking means 12 directly above the top most expansion weight 1 restricts the expandable center arrangement and creates a fixed or stationary arrangement with minimal or no sliding movement capability.

Figure 3:
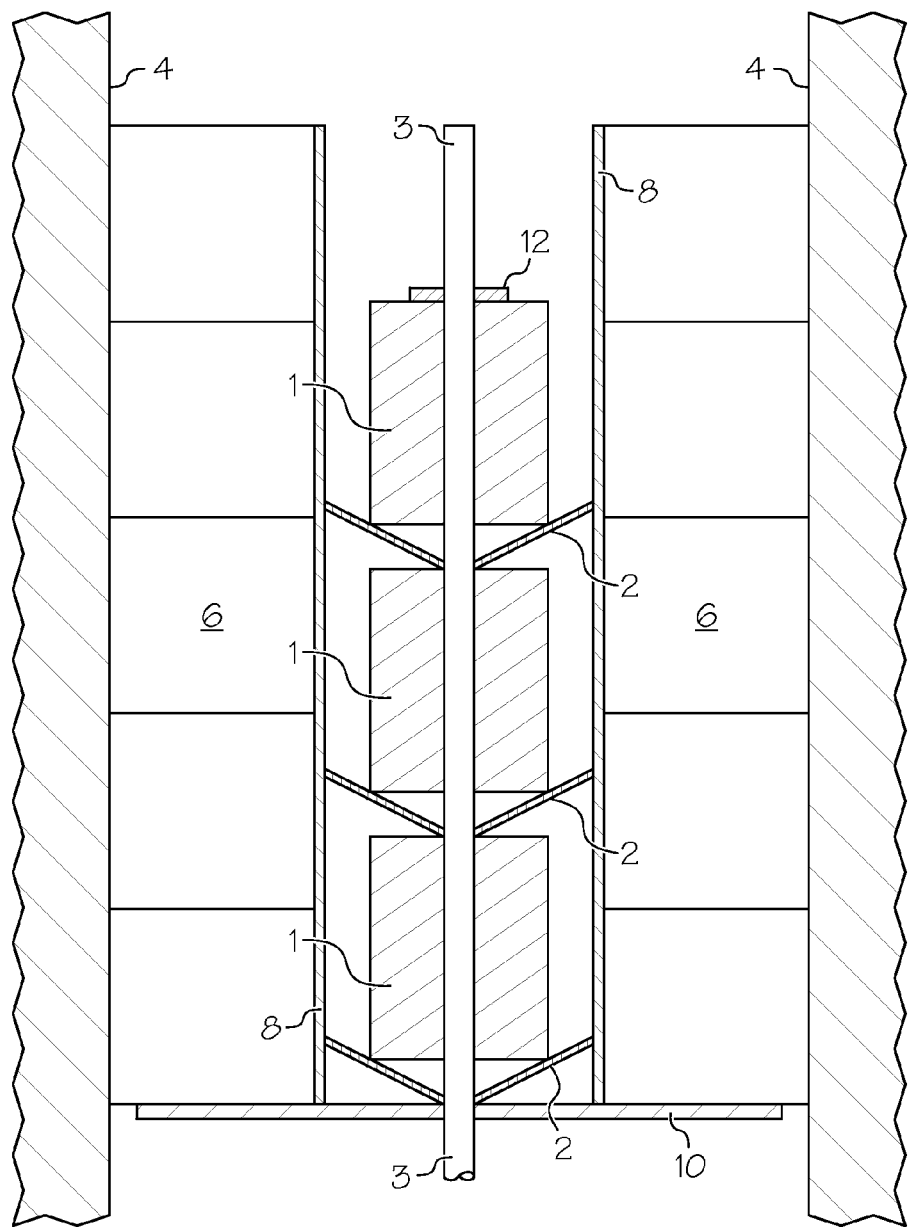
FIG. 3 shows a cross-section view of the reactor tube of FIG. 2 wherein the expanding center arrangement is in the expanded position such that reactor components are in contact with the reactor tube.

As described above, the locking means 12 can be secured in place on the center support 3 subsequent to the reactor components being pushed radially outward by the expanding cones. FIG. 2 illustrates cones 2, the inner tube 8 and reactor components 6 in a collapsed or non-expanded position. In such a position, a significant gap can be seen between the inner wall of the outer tube 4 and the outer diameter face of the reactor components 6. In contrast, FIG. 3 illustrates the reactor of FIG. 2 in the expanded position. As shown, the reactor components 6 are expanded and there is no gap between the inner wall of the outer tube 4 and the outer diameter face of the reactor components 6. Alternatively, the reactor components can be expanded to create a small gap between the outer tube 4 and the components 6.

Also as shown in FIG. 3, the inner tube 8 and cones 2 are in expanded positions. The inner tube 8 has a greater diameter due to the cones 2 pushing radially outward, wherein the diameter of the bottom end of the cones 2, pointing upward, has also increased. Each expanded cone 2 has a decreased height, which allowed the expansion weights 1 and cones 2 to slide downward on the center support 3 during expansion. The locking means 12 can be secured on the center support 3 once the cones are expanded to lock the reactor components 6 in place for reactor operation.

During operation the temperature can increase and the outer tube can creep or expand radially outward away from the reactor components 6 and form a gap between the outer diameter face of the reactor components and the outer tube 4. The expansion weights 1 can slide down along the center support 3 and expand the cones 2 radially against the inner tube 8 to force the reactor components outward to reduce or eliminate such a gap. As the expansion weights 1 slide downward, a gap is created between the locking means 12 and the top surface of the expansion weight 1 and, as temperatures decrease, the expansion weights can slide upward to the locking means 12 as necessary to accommodate retraction.

Figure 4:
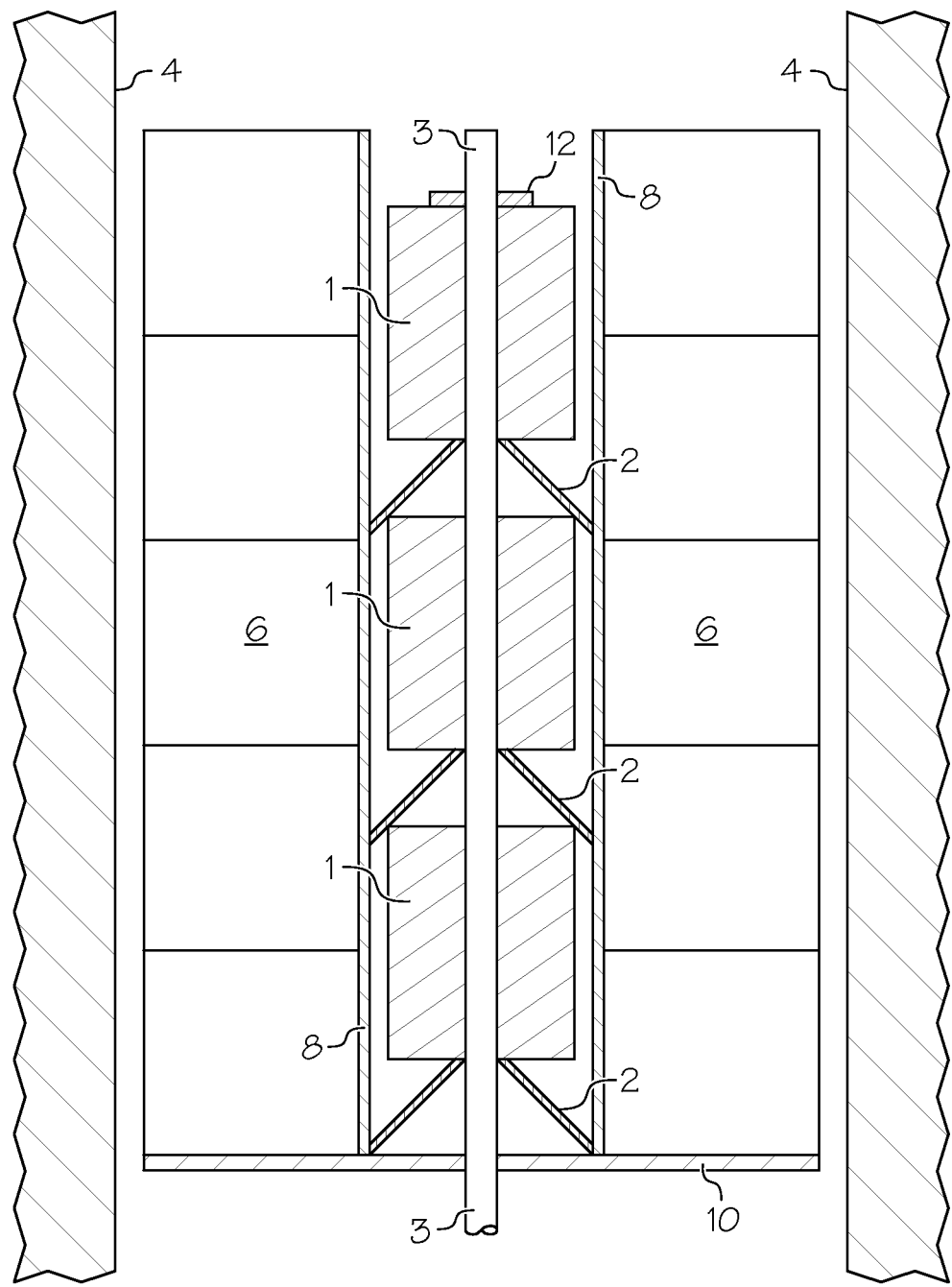
FIG. 4 shows a cross-section view of a reactor tube having an expanding center arrangement including upward facing cones and expansion weights.

FIG. 4 shows a reactor having an expandable center arrangement of expansion weights 1, cones 2 and a center support 3. In contrast to FIGS. 2 and 3, the cones 2 are arranged in series with expansion weights 1 wherein the cones are in the upward facing position. The top end of the cones point upward such that the top end of the cones are in contact with an expansion weight directly above. The expansion weights 1 push downward on the top end of the cones 2 to promote cone expansion radially outward. The bottom end of the bottom most cone 2 in the series of cones rests on the stop plate 10. On the other end of the series, a locking means 12 is positioned above the top most expansion weight 1 to prevent the weights from moving upward on the center support 3 in a direction away from the cones.

Figure 5:
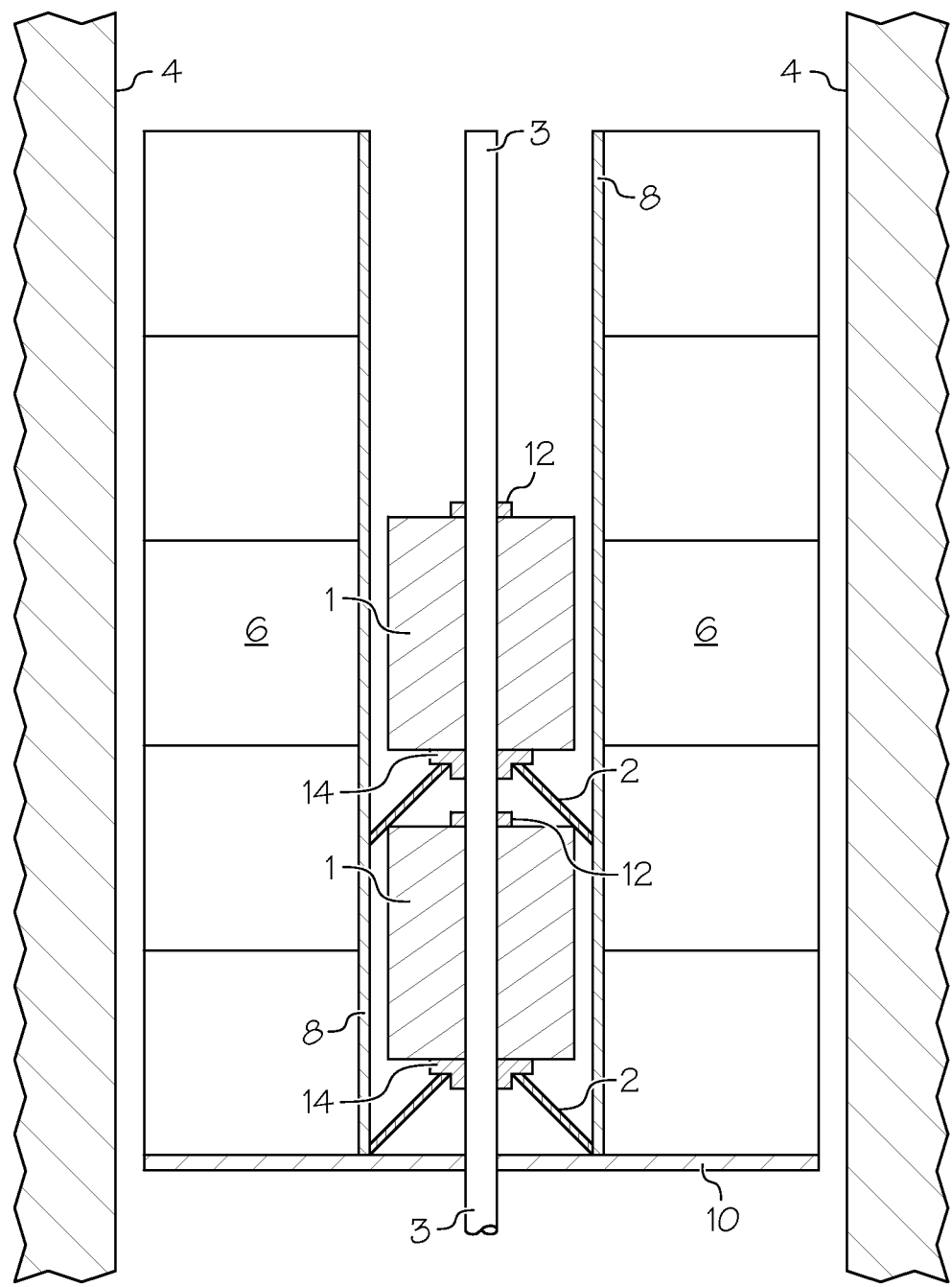
FIG. 5 shows a cross-section view of a reactor tube having an expanding center arrangement including upward facing cones and expansion weights.

FIG. 5 shows a reactor or outer tube 4 having reactor components 6 centered around an inner tube 8 and an expandable center arrangement. The expandable center arrangement has cones 2, facing upward, that are expandable in the radial direction, and expansion weights 1 above each cone 2. The cones 2 and expansion weights are positioned on a center support 3 and are capable of sliding on the center support. The small top end of the cones 2 can be fitted with a bushing 14 for accommodating the center support 3. The bushing 14 structurally supports the cone 2 and enhances the sliding motion on the center support 3. The bushing 14 can be a cylinder having an opening for receiving the center support 3, similar to the opening in the top end of the cones and expansion weights. The large bottom end of the cone 2 contacts the inner tube 8. At its outer diameter, the inner tube 3 contacts the reactor components, such as the fans 6.

As shown in FIG. 5, locking means 12 can be positioned above each expansion weight 1 in series. Although not shown, multiple expansion weights 1 can be stacked above each cone 2 depending on the required weight to induce adequate expansion for forcing the reactor components 6 radially outward to the outer tube 4. With locking means 12 located above each expansion weight 1, or series of weights in direct contact with one another, each combination of one or more expansion weights 1 and a cone 2 represents an isolated expandable center arrangement for forcing the inner tube 8 and reactor components 6 outward. This isolated arrangement or series of isolated arrangements of expandable centers can accommodate changes in the outer tube diameter along its length. The number of isolated expandable center arrangements can be selected as desired and can depend on overall reactor length and dimensions.

Figure 6:
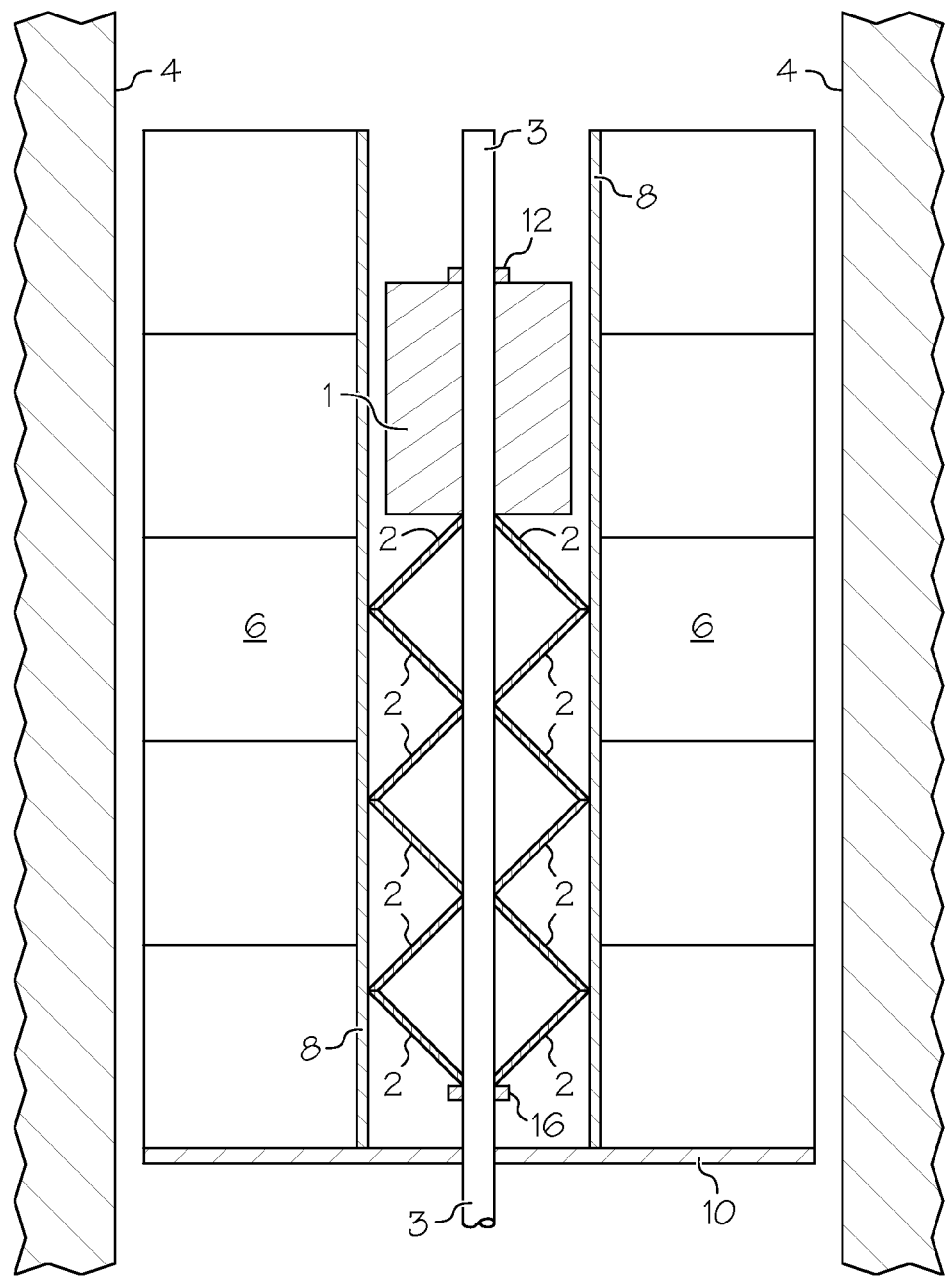
FIG. 6 shows a cross-section view of a reactor tube having an expanding center arrangement including a series of opposing cone pairs and an expansion weight.

FIG. 6 shows another embodiment of an expandable center arrangement for a reactor. Similar to the above-described figures, outer tube 4 houses reactor components 6 that fill a portion of or the entire annular space between the outer tube 4 and the expandable inner tube 8. At the center of the reactor, a series of cones 2 positioned in an opposing arrangement along the length of the center support 3 can be used to promote radial expansion of the reactor components. A single pair of opposing cones 2, or a series of pairs of opposing cones, as shown, can be used. Opposing pairs of cones in a series can each be stacked directly on top of one another wherein each pair contacts another opposing pair, either above or below, or both. In another embodiment, other reactor elements can separate opposing pairs, such as expansion weights or washers, to create an alternative pattern.

To create an opposing pair of cones 2, an upward facing cone can be positioned on top of a downward facing cone such that the larger bottom ends of each cone face each other and simultaneously contact the inner tube 8. In the alternative, an opposing pair can be created by positioning a top most cone in a downward facing position over an upward facing cone so the two smaller top ends of the cones face each other (not shown). Similar to the arrangement shown in FIG. 5, each pair of opposing cones can have an expansion weight isolated with locking means 12 located along the center support 3. For example, each pair of opposing cones can have its own expansion weight wherein a locking means 12 is located directly above the weight to prevent it from traveling away from the pair so constant pressure or force is applied to the pair of cones to promote expansion.

To expand the cones 2, one or more expansion weights 1 can be positioned above a pair of opposing cones or series of pairs as shown. Preferably, an expansion weight 1 is directly in contact with the top most cone of the opposing pair, such as the top most upward facing cone of FIG. 6. As the expansion weight 1 slides or moves down the center support 3, the cones 2 can expand radially with the inner tube 8 to push against the reactor components 6 located near the outer tube 4. Similar to the other embodiments, a locking means 12 can be used at the top of the expansion weight 1 or series of weights to prevent the weights from sliding upward and causing the cones 2 to contract or collapse from an expanded position. A stop nut or lock nut 16 can be positioned below one or more pairs of opposing cones to provide a fixed base for the stack. The stop nut 16 is not slidably arranged on the center support 3. Alternatively, the one or more pairs of opposing cones can rest on the stop plate 10 located at or near the bottom of the center support 3. The stop plate 10 can also function to support the stack of reactor components 6 arranged around the center support 3.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modification as encompassed by the scope of the appended claims.

What is claimed is:

1. An expandable center arrangement for a reactor comprising:
   a) a center support;
   b) a cone positioned on the center support, the cone being expandable in the radial direction and the cone being capable of sliding on the center support;
   c) an expansion weight positioned on the center support, the expansion weight arranged above the cone, wherein the cone is arranged in a downward facing position such that the bottom end of the cone faces the expansion weight, and the expansion weight is in direct contact with the cone; and
   d) a second expansion weight positioned on the center support, the second expansion weight being capable of sliding on the center support, wherein the second expansion weight is arranged below the cone.

2. The expandable center arrangement of claim 1, further comprising a locking means positioned on the center support.

3. The expandable center arrangement of claim 2, wherein the locking means is arranged above the expansion weight, and wherein the locking means prevents the expansion weight from moving on the center support in a direction away from the cone.

4. The expandable center arrangement of claim 1, wherein the cone is made of corrugated foil or from a stamped piece of metal.

5. The expandable center arrangement of claim 1, wherein the expansion weight has a center opening for accommodating the center support, and the expansion weight is capable of sliding on the center support.

6. The expandable center arrangement of claim 1, wherein the expansion weight is a cylinder having an outer diameter and a center opening, and wherein the outer diameter of the expansion weight is at least 50 percent of the diameter of the bottom end of the cone.

7. A reactor comprising:
   a) an outer tube;
   b) an inner tube, wherein the inner tube is expandable in the radial direction;
   c) an expandable catalyst support positioned between the outer tube and the inner tube, wherein the expandable catalyst support occupies an annular space between the outer tube and the inner tube and the expandable catalyst support comprises a center support;
   d) a cone positioned within the inner tube, wherein the cone is expandable in the radial direction and the cone is capable of sliding on the center support, and
   e) an expansion weight positioned on the center support, the expansion weight arranged above the cone, wherein the cone is arranged in a downward facing position such that the bottom end of the cone faces the expansion weight, and the expansion weight is in direct contact with the cone.

8. The reactor of claim 7, wherein the cone is in contact with the inner tube.

9. The reactor of claim 7, further comprising a locking means positioned on the center support.

10. The reactor of claim 9, wherein the locking means is arranged above the expansion weight, wherein the locking means prevents the expansion weight from moving on the center support in a direction away from the cone.

11. The reactor of claim 7, wherein the expandable inner tube is formed from a rolled piece of metal.

12. The reactor of claim 7, wherein the cone is made of corrugated foil.

13. The reactor of claim 7, further comprising a second cone positioned within the inner tube.

14. The reactor of claim 7, further comprising a second expansion weight positioned within the inner tube.

* * * * *